March 24, 1970 G. A. HENSON 3,502,068
DISPOSABLE FOOD CONTAINER HEATER
Filed Feb. 14, 1969 3 Sheets-Sheet 1

George A. Henson
INVENTOR.

BY *Clarence A. O'Brien*
*and Harvey B. Jackson*
Attorneys

March 24, 1970     G. A. HENSON     3,502,068
DISPOSABLE FOOD CONTAINER HEATER
Filed Feb. 14, 1969     3 Sheets-Sheet 2

George A. Henson
INVENTOR.

March 24, 1970 G. A. HENSON 3,502,068
DISPOSABLE FOOD CONTAINER HEATER
Filed Feb. 14, 1969 3 Sheets-Sheet 3

George A. Henson
INVENTOR.

United States Patent Office 3,502,068
Patented Mar. 24, 1970

3,502,068
DISPOSABLE FOOD CONTAINER HEATER
George A. Henson, Colorado Springs, Colo.
(P.O. Box 541, Monument, Colo. 80132)
Substituted for abandoned application Ser. No. 612,423, Jan. 30, 1967. This application Feb. 14, 1969, Ser. No. 824,331
Int. Cl. A47j 36/26; F24c 1/16; B65d 25/00
U.S. Cl. 126—262                              10 Claims

ABSTRACT OF THE DISCLOSURE

A disposable heater for a food container such as a can, the heater having a casing adapted to contain fuel. The casing is separable into upper and lower casing members having projections which may be seated on each other for supporting the upper casing member on the lower member with spaces between the projections providing vents for combustion of the fuel.

---

This invention relates to new and useful improvements in disposable heaters, and the principal object of the invention is to provide a disposable heater which may be conveniently employed for heating contents of food containers, particularly cans of food.

As such, the disposable heater of the invention comprises a metallic casing containing a quality of fuel, the heater casing being so constructed that it may be conveniently connected to a can of food during the canning operation, whereby the can of food and the associated heater become a unitary entity and the heating facility is readily available when the contents of the can are to be consumed.

Alternatively, the heater of the invention may be provided by itself for application to a conventional food can, or for that matter, any conventional food container may be positioned on the heater without a positive physical connection between the two.

An important feature of the invention resides in the construction of the heater casing which is separable into upper and lower casing members along a vertically zigzagged line so as to form upward projections on the lower member and downward projections on the upper member. Upon their separation, the casing members may be relatively rotated so that their projections are disposed in substantial vertical alignment and seated on each other so that the upper casing member is effectively supported on the lower casing member and spaces between the projections afford vents for combustion of fuel within the casing.

The device of the invention is very simple in construction, efficient and dependable in operation, and lends itself to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
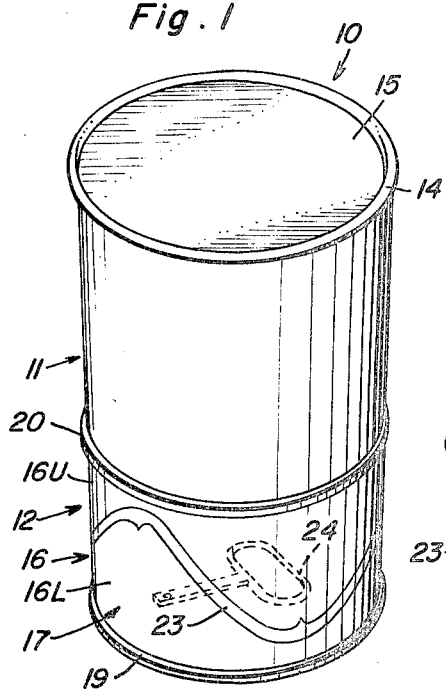
FIGURE 1 is a perspective view showing the heater of the invention in association with a food can.
Figure 3:
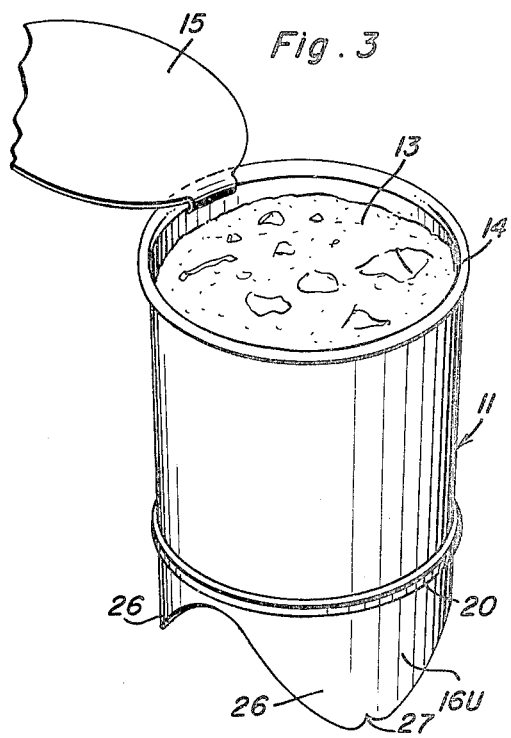
FIGURE 3 is a perspective view illustrating the food can with the upper casing portion of the heater and the top of the can open.

Referring now to the accompanying drawings in detail, the general reference numeral 10 in FIGURE 1 designates a combination of a conventional food can 11 with a disposable heater 12 of the invention. The can 11, containing a quantity of food 13, is of a conventional type, being provided with the usual, annular end seams 14, 14a and having a top end wall 15 which is adapted to be opened in the usual manner, as illustrated in FIGURE 3.

The disposable heater 12 comprises a substantially cylindrical, metallic casing 16 which has an open top and includes a circumferential wall 17 and a bottom 18. The side wall 17 is connected to the bottom 18 in any suitable manner, as for example, by a conventional annular bead 19.

Figure 5:
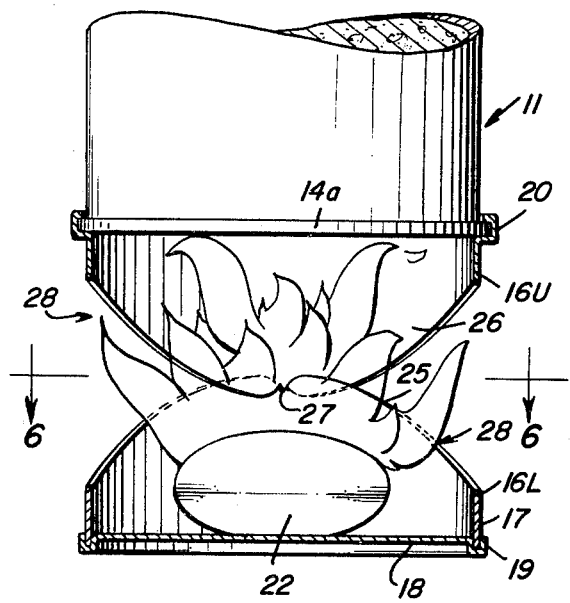
FIGURE 5 is a fragmentary vertical sectional view, taken substantially in the plane of the line 5—5 in FIGure 4.
Figure 8:
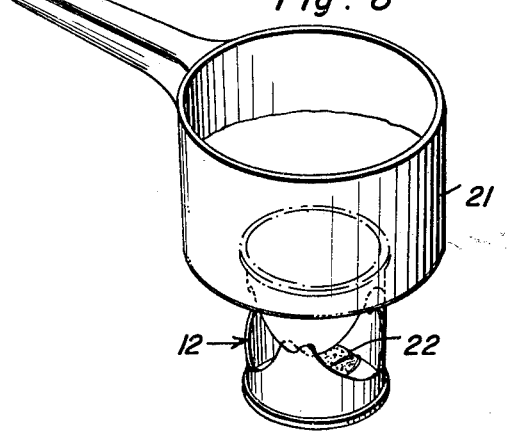
FIGURE 8 is a perspective view on a reduced scale, showing the heater in readiness for use with a conventional sauce pan.
Figure 9:
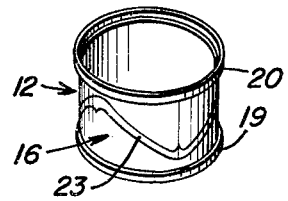
FIGURE 9 is a perspective view of the heater casing per se, prior to the separation of the casing members.

The upper edge portion of the casing wall 17 is provided with an annular flange 20 which is deformable and may be rolled around the lower end seam 14a of the can 11 as shown in FIGURE 5, whereby to connect the heater 12 to the can 11 so that the heater and the can become a unitary entity. This connection of the heater to the can may be performed during the food canning operation, if it is desired to supply the can of food with the associated heater to the purchaser as a unit. Alternatively, the heater 12 may be provided by itself so that the purchaser may apply it to any conventional can by simply seating the lower end of the can in the annular flange 20 at the top of the heater casing. Also, the heater may not be used with a conventional can of food, but with any other suitable food container, as for example, a sauce pan 21 which is simply rested on top of the heater as illustrated in FIGURE 8.

The heater casing 16 contains a quantity of fuel, as for example, a fuel capsule 22 which is loosely positioned in the casing. Such fuel may be solid, or semi-solid, or of any other suitable consistency, as is well known in the art.

Figure 2:
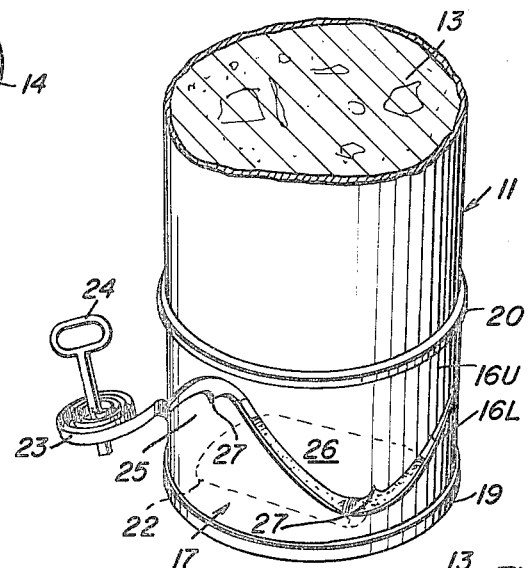
FIGURE 2 is a fragmentary perspective view illustrating the tear strip of the heater casing being removed.
Figure 7:
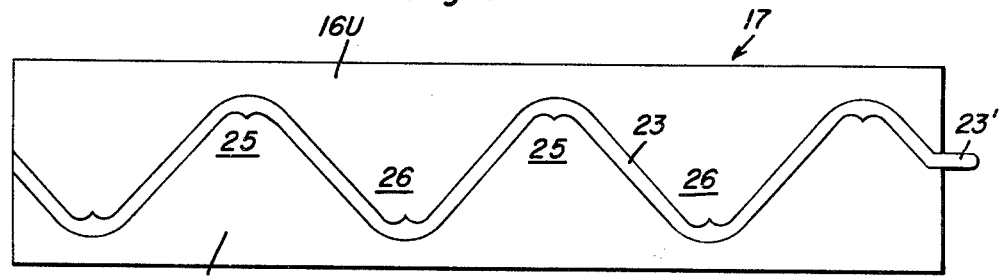
FIGURE 7 is a developed view of the side wall of the heater casing with its associated tear strip.

The side wall 17 of the heater casing 16 is provided with a circumferentially extending, removable tear strip 23 which, as is best shown in the developed view of FIGURE 7, has a vertically undulated or zigzagged configuration and terminates at one end thereof in a free tab 23', so that a conventional winding key 24 may be applied to the strip and the strip removed in the conventional manner, as illustrated in FIGURE 2. Conveniently, the key 24 may be removably attached to the underside of the bottom 18 of the heater casing, so that it is readily available when the heater is to be used.

Figure 4:
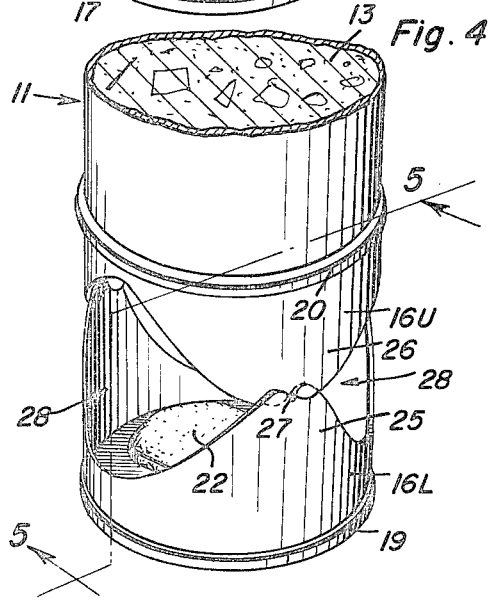
FIGURE 4 is a fragmentary perspective view of the can with the casing portions of the heater seated upon each other in readiness for ignition of the fuel.
Figure 6:
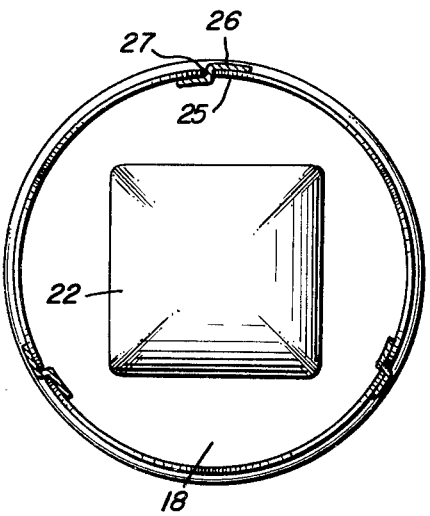
FIGURE 6 is a horizontal sectional view, taken substantially in the plane of the line 6—6 in FIGURE 5.

When the undulated tear strip 23 is removed from the casing side wall 17, the casing is separated into what may be referred to as the lower casing member 16L and the upper casing member 16U. By virtue of the undulated form of the tear strip, the lower casing member 16L has a set of upward projections 25 and similarly, the upper casing member 16U has a set of downward projections 26. The projections in each set are circumferentially spaced and the form of the tear strip is such that when the strip is removed, the extremities of the projections 25, 26 are provided with notched seats 27. Accordingly, after the casing members 16L and 16U are separated by removal of the tear strip 23, the casing members may be rotated relative to each other so that the sets of projections 25 of the lower casing member become substantially vertically aligned with the sets of projections 26 of the upper casing member, and the aligned projections may be interseated in the notches 27 as is best shown in FIGURES 4 and 5 to facilitate supporting of the upper casing 16U with the associated can 11 on the lower casing member 16L. In this connection it should be mentioned that the material of the side wall 17 is sufficiently flexible or deformable so that when the projections 25, 26 are to be interengaged, they may be slightly twisted in a horizontal plane to facilitate the aforementioned seating in the notches 27, as will be apparent from FIGURES 4-6. Preferably, three projections are provided in each set for proper stability, although this number may be increased if so desired.

It will be also noted that prior to the removal of the tear strip 23, the projections 25, 26 of the casing members 16L, 16U are interfitted so that the heater casing is relatively shallow in over-all height. However, upon separation of the casing members and interengagement of their projections, the over-all height of the heater casing is substantially increased and the resultant spaces between the projections afford openings or vents 28 to facilitate combustion of the fuel 22.

When the invention is used, either as a unitary component of a can of food or as an attachment thereto, the winding key 24 is detached from the bottom wall 18 and is applied to the tab 23' of the tear strip 23, whereupon the tear strip is wound around the key for removal of the tear strip from the heater casing. Thus, the casing is separated into the upper and lower casing members, which are then relatively rotated to align the projections 25, 26 for interengagement of their seats 27. With the can top 15 opened, the fuel 22 may then be ignited for heating the contents of the can.

It will be observed that the aforementioned seam or bead 19 joining the side wall 17 of the heater casing to the bottom 18 also serves to space the bottom of the casing above a supporting surface on which the heater is positioned, so that the supporting surface is safeguarded against damage by heat.

Figure 10:
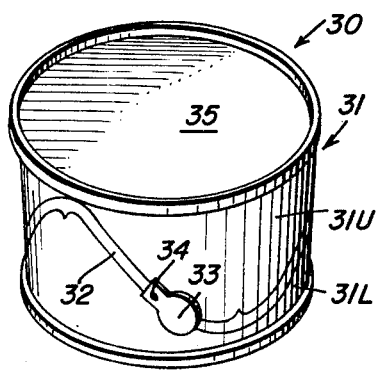
FIGURE 10 is a perspective view showing a modified embodiment of the heater.
Figure 11:
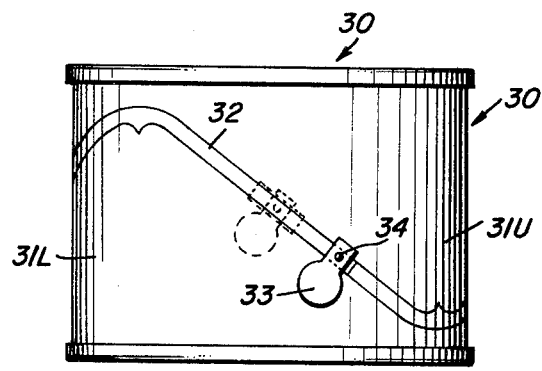
FIGURE 11 is a side elevational view thereof.

FIGURES 10 and 11 illustrate a modified embodiment of the heater per se which is designated generally by the reference numeral 30 and is similar to the heater 16 in that it consists of a casing 31 which is separable into upper and lower casing members 31U, 31L, respectively, the side wall of the casing having a removable zigzagged tear strip 32.

In place of a separate winding key such as the aforementioned key 24, a pull tab 33 is provided on the tear strip 32, so that the tear strip may be removed by the pull tab. If desired, the pull tab may be connected to the tear strip by a pivot element 34, so that after an initial length of the strip has been torn away by pulling on the tab, the tab may be swung about the pivot 34 from the position shown in FIGURE 10 to that shown in FIGURE 11, whereupon the pull tab may be utilized in the manner of a winding key for winding the tear strip around the tab while the strip is being removed.

While the aforementioned heater 16 has a casing with an open top, the casing 31 of the heater 30 has a closed top wall 35 in order to retain a fuel capsule within the casing if the heater is marketed and supplied to the purchaser as a separate unit, independently of a can of food. Of course, the fuel capsule need not be provided in the heater casing, since it may be inserted into the casing after the casing members have been separated from each other.

Figure 12:
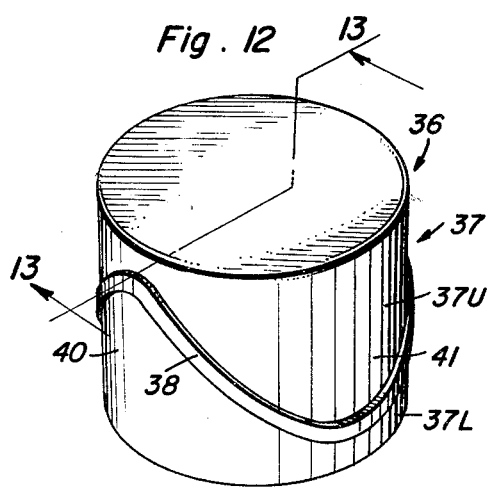
FIGURE 12 is a perspective view showing another modified embodiment of the heater.
Figure 14:
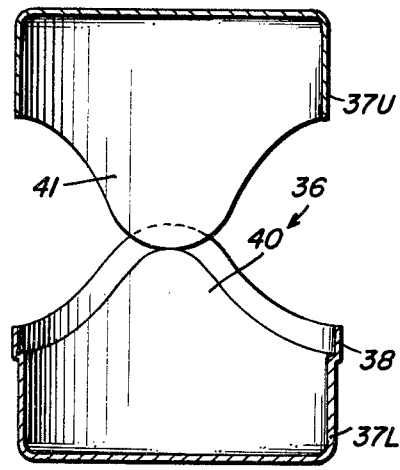
FIGURE 14 is a vertical sectional view of the heater of FIGS. 12 and 13, but with the heater members separated and assembled in their operative position.
Figure 13:
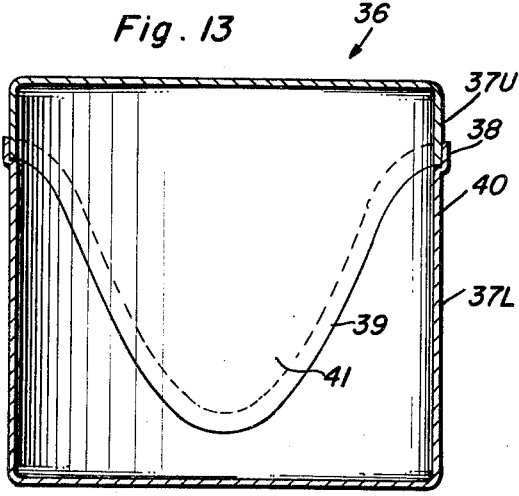
FIGURE 13 is a vertical sectional view taken substantially in the plane of the line 13—13 in FIGURE 12.

FIGURES 12–14 illustrate another modified embodiment of the heater designated generally by the reference numeral 36. In this instance the heater casing 37 is separable into upper and lower casing members 37U, 37L, respectively, but a tear strip such as the strip 23 or 32 is not provided. Rather, one of the casing members, as for example, the lower member 37L, is formed integrally with a radially outwardly stepped, annular flange or lip 38 which telescopes over the lower edge portion of the casing member 37U to separably hold the two casing members together. This is illustrated in FIGURES 12 and 13 and it will be apparent that the flange or lip 38 follows the zigzagged or undulated line of separation 39 between the two casing members, so that when the members are separated, the lower member has upward projections 40 and the upper member has downward projections 41. Upon relative rotation of the casing members to a position wherein these projections are vertically aligned, the projections 41 may be seated on the projections 40 while the lip 38 serves to retain the casing members in coaxial relation and thereby prevent undesired unseating of the projections. Thus, with the lip 38 provided as described, the projections 40, 41 need not be formed with the notched seats 27 such as are present in the embodiment of FIGS. 1–9 and 10–11.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A disposable heater for food containers and the like, said heater comprising a substantially cylindrical casing adapted to have positioned thereon a food container to be heated, said casing including lower and upper casing members separably connected together along a vertically zigzagged line extending circumferentially of the casing whereby upon separation of the casing members the lower member is formed with a set of circumferentially spaced upward projections and the upper member is similarly formed with a set of circumferentially spaced downwardly projections, the lower casing member being adapted to contain a quantity of fuel, a relative rotation of said casing members to a position wherein the projections thereof are in vertical alignment permitting the projections of the upper casing member to be seated on those of the lower casing member with circumferential spaces between the aligned projections affording vents for combustion of the fuel.

2. The device as defined in claim 1 together with a circumferential lip provided on one of said casing members and overlapping the other casing member along said zigzagged line of separablec onnection of the casing members, said lip providing seats on the projections of said one member for the projections of the other member when the members are separated and the projections are aligned.

3. The device as defined in claim 1 wherein said casing includes a side wall provided with a circumferentially extending vertically zigzagged removable tear strip which, upon its removal separates the casing into said upper and lower casing members.

4. The device as defined in claim 3 wherein said tear strip is formed to provide notches in the extremities of said projections, said notches constituting seats whereby the projections of the upper casing member may be seated on those of the lower member.

5. The device as defined in claim 3 together with a winding key for said tear strip.

6. The device as defined in claim 1 wherein said casing has an open top and is provided at its upper edge with an annular flange, said flange being deformable for connection to an annular seam of a food can.

7. The device as defined in claim 1 together with a fuel capsule loosely positioned in the lower member of said casing.

8. The combination of a food can and a disposable heater for said can, said heater comprising a substantially cylindrical casing having an open top and connected at its upper end to the lower end of said food can, said casing including lower and upper casing members separably connected together along a vertically zigzagged line extending circumferentially of the casing whereby upon separation of the casing members the lower member is formed with a set of circumferentially spaced upward projections and the upper member is similarly formed with a set of circumferentially spaced downwardly projections, the lower casing member being adapted to contain a quality of fuel, a relative rotation of said casing members to a position wherein the projections thereof are in vertical alignment permitting the projections of the upper casing member to be seated on those of the lower casing member with circumferential spaces between the aligned projections affording vents for combustion of the fuel.

9. The combination as defined in claim 8 wherein said casing includes a side wall provided with a circumferentially extending vertically zigzagged removable tear strip which, upon its removal, separates the casing into said upper and lower casing members.

10. The combination as defined in claim 8 together with a fuel capsule loosely positioned in the lower member of said casing.

References Cited

UNITED STATES PATENTS 3,262,445   7/1966   Stults et al. _____ 126—262

FOREIGN PATENTS 975,669   10/1950   France.

CHARLES J. MYHRE, Primary Examiner

U.S. Cl. X.R.

126—43